C. O. EVENSON.
TIRE GAUGE.
APPLICATION FILED MAR. 12, 1921.
1,437,504.
Patented Dec. 5, 1922.
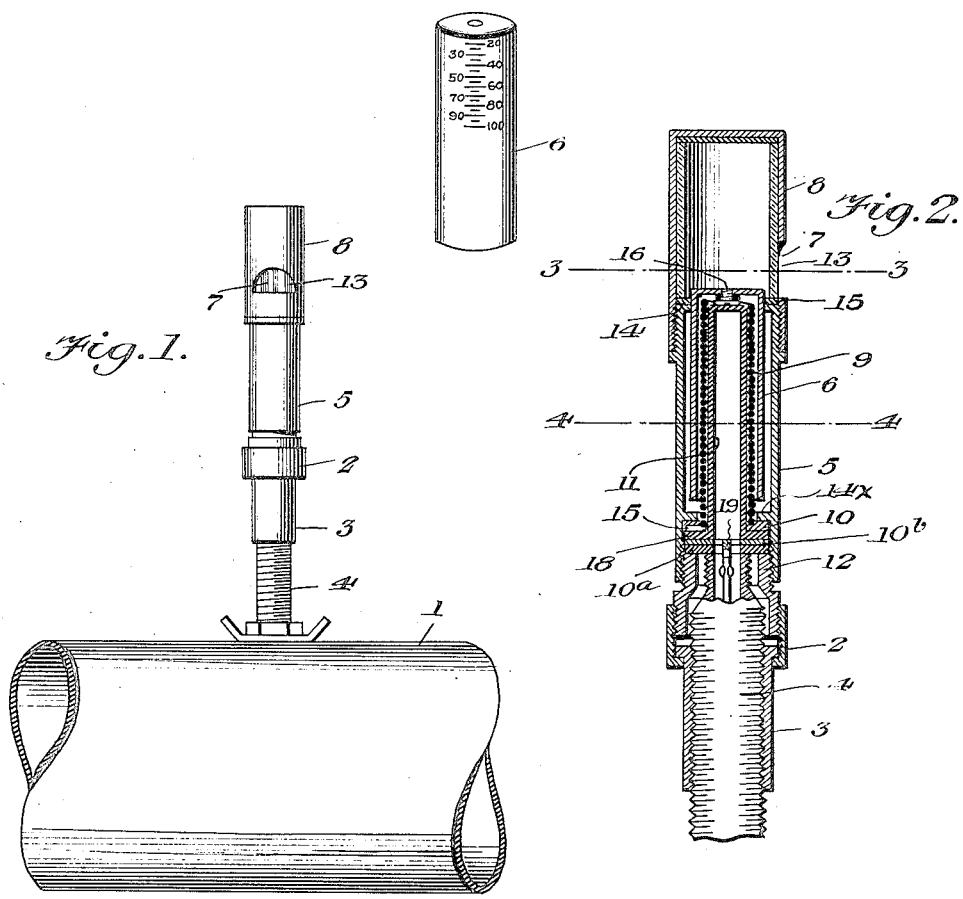
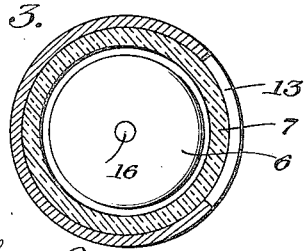
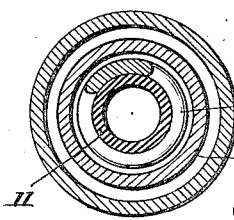
C. O. Evenson
INVENTOR
BY Victor J. Evans
ATTORNEY Patented Dec. 5, 1922.

1,437,504

UNITED STATES PATENT OFFICE.

CLARENCE OSCAR EVENSON, OF VALDERS, WISCONSIN.

TIRE GAUGE.

Application filed March 12, 1921. Serial No. 451,696.

*To all whom it may concern:*

Be it known that I, CLARENCE O. EVENSON, a citizen of the United States, residing at Valders, in the county of Manitowoc and State of Wisconsin, have invented new and useful Improvements in Tire Gauges, of which the following is a specification.

The object of my present invention is the provision of a simple, reliable and readily attachable and detachable tire gauge, designed to be carried on an automobile wheel and to enable a motorist to tell at a glance the pressure of air in the tire with which the gauge is connected.

To the attainment of the foregoing, the invention consists in the improvement as hereinafter described and definitely claimed.

In the accompanying drawings, forming part hereof:—

Figure 1 is a side elevation illustrating my novel tire gauge as applied.

Figure 2 is an enlarged longitudinal central section showing the gauge and the manner of attaching or connecting the same.

Figures 3 and 4 are cross sections taken in the planes indicated by the lines 3—3 and 4—4, respectively, of Figure 2.

Figure 5 is a detail perspective of the gauge member.

Similar numerals of reference designate corresponding parts in all of the views of the drawings.

My novel gauge is extensible under the pressure of air in the tire 1 and is contractible in accordance with lessening of the air pressure in the tire 1, with the result that a motorist by referring to the gauge is enabled at all times to ascertain exactly the pressure of the air in the tire. The gauge can be expeditiously and easily removed by loosening the union coupling 2 which works independently on the valve coupling 3, and from this it follows that the gauge may be as readily attached. It will also be appreciated that the gauge is air tight and not liable to be affected by a leak in the valve stem 4, and that the gauge is susceptible of being readily taken apart and repaired.

Among other elements the gauge comprises a casing 5, preferably of metal, a graduated gauge member 6, a transparent cylinder 7, preferably of glass, a cap 8, a spring 9, a washer 10, and a rubber or elastic tube section 11 as well as a union 12. The cap 8 is apertured as indicated by 13, and is designed to fit over the glass cylinder 7 and to fasten the same down on the casing 5 on which the cap 8 is threaded, Figure 2. The cylinder 7 rests on the inturned end flange 14 of the casing 5 with a rubber washer 15 between to render the joint air tight. The spring 9 is disposed within the graduated gauge member 6 and is fastened thereto through the medium of a small screw 16. The rubber or elastic tube 11 is extended through the washer 10 and into the spring 9, and the base flange 18 on the rubber tube is fastened between the washer 10, on the one hand, and the washer $10^a$ and metallic annulus $10^b$, on the other. The washer 10 is opposed to an interior flange $14^x$ in casing 5, and the lower terminal 15 of the spring 9 is secured in the washer 10 at the inner side of said flange $14^x$, Figure 2.

It will be apparent from the foregoing that the air in the tire will enter the gauge, and because of the spring 9 and elastic tube 11 the gauge will expand and contract in the direction of its length; and it will also be apparent that the graduated member 6 can be conveniently viewed through the glass cylinder 7 within the cap 8.

The metallic annulus $10^b$ carries a teat 19 opposed to the valve stem as illustrated.

Having described my invention, what I claim and desire to secure by Letters Patent, is:—

In a pressure gauge, the combination of a casing having an interior annular flange at an intermediate point of its length, a gauge member guided in the casing, and elastic tube connected at one end to the gauge member and having a base flange arranged at the opposite side of the said casing flange, with reference to the gauge member, an annular washer interposed between said base flange and said casing flange, an annular washer and a metallic annulus arranged at the opposite side of the base flange, with reference to the first-named washer and a coiled spring surrounding the elastic tube and connected at one end to the gauge member and secured at its opposite end in the first-named washer.

In testimony whereof I affix my signature.

CLARENCE OSCAR EVENSON.